April 29, 1958  M. BAERMANN  2,832,206
DEVICE FOR OPERATING VACUUM FLASH BULBS
Filed Jan. 6, 1956  2 Sheets-Sheet 1
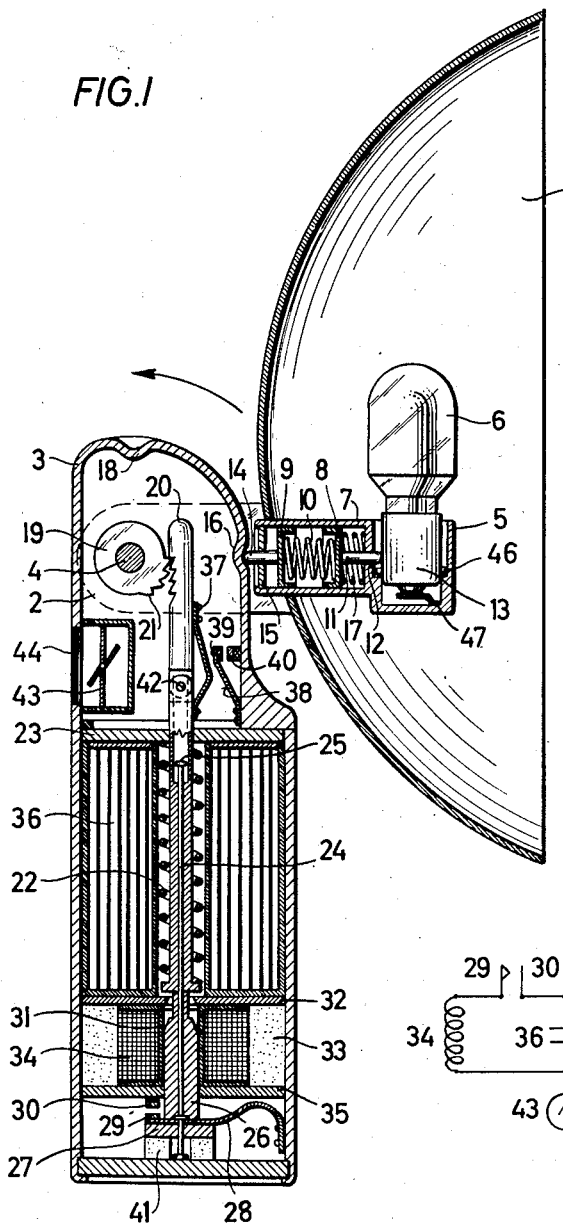
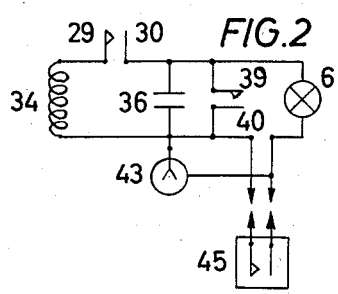
INVENTOR.
MAX BAERMANN
BY
Alfred C. Body
ATTY April 29, 1958     M. BAERMANN     2,832,206
DEVICE FOR OPERATING VACUUM FLASH BULBS
Filed Jan. 6, 1956     2 Sheets-Sheet 2
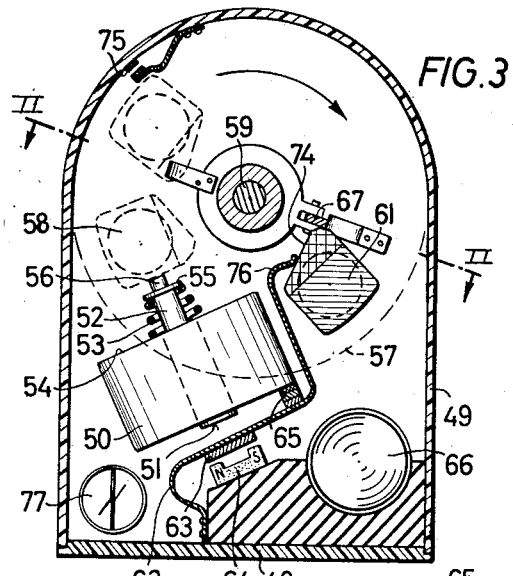
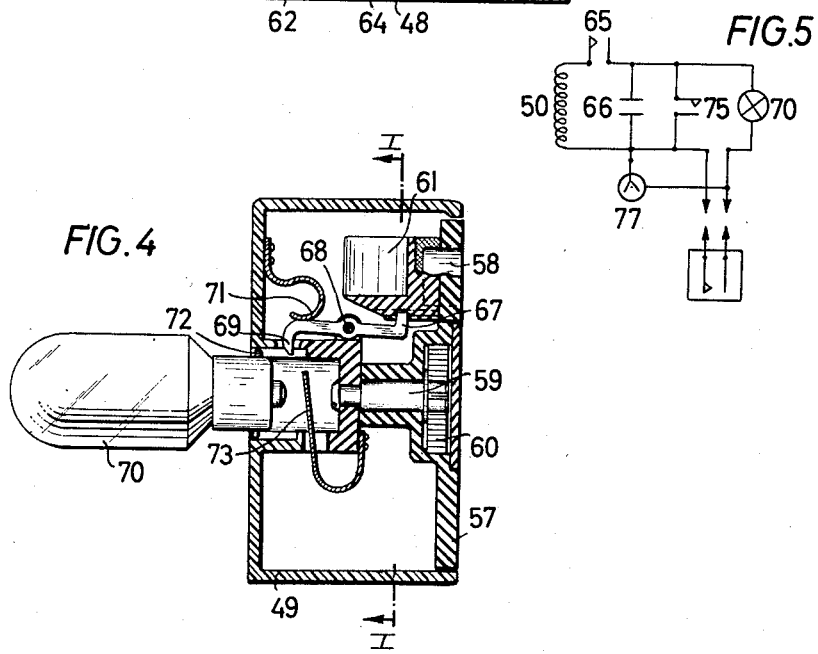
INVENTOR.
MAX BAERMANN
BY Alfred C. Body
ATTY

United States Patent Office 2,832,206
Patented Apr. 29, 1958

2,832,206

DEVICE FOR OPERATING VACUUM FLASH BULBS

Max Baermann, Cologne, Germany

Application January 6, 1956, Serial No. 557,758

Claims priority, application Germany January 28, 1955

13 Claims. (Cl. 67—31)

This invention pertains to the art of vacuum flash bulbs and more particularly to apparatus for firing such flash bulbs.

Heretofore it has been conventional to fire the flash bulbs by a current obtained from a condenser which is connected to the flash bulb by a contact built into the shutter of the camera. With such apparatus it is necessary to synchronize the closing of the contact with the time lag characteristics of the flash bulb and the shutter so that the light flash occurs at the moment when the camera shutter is fully opened. This time lag usually amounts to a few milliseconds. After the firing of the flash bulb it is necessary to insert a new one and recharge the condenser from a battery built into the apparatus, either through a contact built into the flash bulb socket, through the flash bulb itself, or through a current limiting resistance. The apparatus is then ready to operate again. Such apparatus requires a comparatively expensive battery which must be replaced at frequent intervals if proper operation is to be obtained.

To eliminate the use of such expensive batteries, it has been proposed to use electric generators which are operated either by hand or by a spring mechanism at the moment when the flash is desired. With such apparatus, precise synchronizing of the firing of the flash bulb and the opening of the camera shutter is very difficult to obtain and can only be accomplished at considerable expense.

It has further been proposed to employ an electric generator for the purpose of charging a condenser which then supplies the current to fire the flash bulb through the contact built into the shutter of the camera. With such an arrangement difficulty of synchronizing the light flash with the camera shutter exists; thus, the time lag between the closing of the contact and the light flash will vary depending upon the voltage to which the condenser is charged. This voltage depends upon the speed at which the charging generator is driven, which will in turn depend upon the method of hand actuation or by the condition of the spring mechanism when it is released to drive the generator. Thus it has been conventional to provide centrifugal governors or similar devices built into the generators to provide for a constant charging voltage. Such devices are not only expensive but bulky and heavy.

A further difficulty with such generator-operated equipment is that there is no way of insuring that the condenser is recharged after the firing of one flash bulb and the insertion of a new one. It is thus entirely possible that the shutter can be operated without the flash bulb being fired.

The present invention contemplates a new and improved apparatus for operating vacuum flash bulbs in which a condenser is charged by an electromagnetic generator which overcomes all of the above-referred to difficulties and others and is simple in construction, convenient to use and reliable in operation.

In accordance with present invention there is provided, in combination: a flash bulb socket, a condenser adapted to be connected to the socket and fire a flash bulb therein, a magneto electric generator driven by a spring mechanism and means to obstruct the socket such as a catch, pin or lever so arranged with the mechanism so as to prevent the insertion of a flash bulb until the generator has been actuated to charge the condenser which then simultaneously removes the obstruction means.

Further in accordance with the invention, there is provided, in combination: a condenser for supplying electrical energy to fire flash bulbs, an intermittently-actuated generator for charging the condenser, and charging contacts in the circuit between the generator and condenser so arranged as to connect the generator to the condenser from the moment the generator is actuated until it reaches its highest voltage. Thus, the condenser will be charged with the maximum possible energy. Means either mechanical or in the form of a small permanent holding magnet may be employed to hold this contact open.

Further in accordance with the invention, discharge contacts are provided in the circuit so arranged as to short-circuit the condenser as the driving means, such as a pre-stressed spring mechanism, for the generator is prepared for operation. This arrangement guarantees that the condenser will be fully discharged at the moment that the charging contact is closed and thus the danger of burning or eroding the charging contact is eliminated when it closes due to any residual energy which might be in the condenser after having previously fired other flash bulbs.

Further in accordance with the invention, there is provided in addition an electrostatic-type meter connected across the condenser through the flash bulb when it is inserted in the socket. Such meter may thus not only indicate that the condenser is properly charged but also that the flash bulb forms a completed circuit across the condenser and camera contacts and is thus ready to be flashed when the camera contacts are closed.

Further in accordance with the invention, the apparatus includes, in combination: a generator for charging the condenser, a spring drive for driving the generator, a socket for receiving the flash bulb, obstruction means in the socket for preventing insertion of a flash bulb when the spring mechanism is not pre-tensioned and means interconnecting the socket and the spring mechanism whereby movement of the socket relative to the mechanism can pre-tension the mechanism and simultaneously remove the obstruction from the socket.

Further in accordance with the invention, there is provided, in combination: a spring mechanism for driving the generator, an axially movable socket for receiving the flash bulb interconnected with the spring mechanism such that axial movement of the socket will pre-tension the mechanism, an obstruction means in the socket for preventing insertion of the flash bulb until the socket has been moved an axial distance sufficient to pre-tension the mechanism.

Further in accordance with the invention, a spring mechanism is provided for driving the generator which can be initially pre-stressed in combination with obstruction means in the socket for the flash lamp so arranged that the insertion of a lamp into the socket releases the spring mechanism to drive the generator.

Further in accordance with the invention, there is provided a drive spring which is tightened by turning a dial provided with a recess intended for finger operation, similar to a telephone dial, in combination with a member fastened to the dial which, when the dial is released, is rapidly returned to the unstressed position of the spring to actuate the generator.

While the invention has above been described in connection with any form of electric generator, preferred embodiments of the invention contemplate the use of a magneto-electric impact-type generator including a magnetic circuit energized by a permanent magnet and an induction coil coupled with the magnetic circuit, voltage being induced in the coil by a rapid opening or closing of the magnetic circuit. The advantages of such an impact generator lie not only in its type of construction and size, which are quite favorable for the purposes of this invention, but more particularly it can be operated by a linear movement which can then be very simply coupled with the removal of the socket obstruction means.

Furthermore the moving parts of the impact generator move almost without friction in comparison to all rotating generators which have both a variable friction in the bearings and a variable brush contact at the commutator.

With the invention and particularly with the charging and discharging contacts above described, the generator can be driven by a pre-stressable spring mechanism which can be pre-tensioned to the desired degree at any desired speed, either fast or slow, but as either the generator is not connected to the condenser during this pre-tensioning operation or because the condenser is short-circuited during or at the end of this pre-tensioning operation, the condenser will always have the same amount of electrical energy therein at the moment that the generator is actuated by release of the spring mechanism. As the spring mechanism always moves the generator at the same speed, the energy supplied to the condenser will always be the same and an exact synchronization between the light flash and the shutter opening may be provided on every operation of the flash bulb.

Further, it will be apparent that the insertion of the flash bulb in the socket will be impossible unless the condenser is fully charged.

The condenser may be charged by the generator to any desired voltage but it is preferred that a voltage of about 200 volts be used. With such a high voltage, the capacity of the condenser can be considerably reduced in comparison with battery-operated apparatus of the same discharge energy. Thus for a given size of condenser, a dielectric of high insulation value can be employed. Thus it is possible to reduce the leakage through the condenser so that once the condenser is charged it will remain ready to fire a flash bulb for relatively long periods.

The principal object of the invention is the provision of a new and improved apparatus for firing a flash bulb which is simple in construction, convenient to use and reliable in operation.

Another object of the invention is the provision of a new and improved apparatus for firing a flash bulb wherein the flash bulb cannot be inserted in its socket until the apparatus is in condition to fire the bulb when the camera contacts are closed.

Another object of the invention is the provision of new and improved apparatus for charging a condenser adapted to be connected and fire a vacuum flash bulb through camera contacts which insures that the condenser will always be charged to the same energy regardless of how the operator handles the apparatus.

Another object of the invention is the provision of new and improved apparatus for charging a condenser intended to be connected to a flash bulb for the purpose of firing same wherein the generator is only electrically connected to the condenser during the time the generator is being actuated.

Another object of the invention is the provision of new and improved arrangement for insuring that the condenser will always be charged to the same voltage.

Still another object of the invention is the provision of a new and improved means for indicating when the condenser is charged and the flash bulb is in proper working condition to be flashed by the energy in the condenser when the camera contacts are closed.

Another object of the invention is the provision of a new and improved means wherein an insertion of the flash bulb in the socket effects a charging of the condenser for flashing the flash bulb.

Another object of the invention is the provision of a new and improved generator for charging the condenser of apparatus for firing flash bulbs including a magneto-electric impact type generator actuated by a pre-tensioned spring.

Another object of the invention is the provision of a new and improved apparatus for firing a flash bulb wherein the energy for firing the flash bulb is stored in the condenser which insures that the condenser will always be charged with the same energy so that synchronization between the light flash and the shutter opening is always possible.

The invention may taken physical form in certain parts and arrangement of parts, preferred embodiments of which will be described in detail in this specification and illustrated in the accompanying drawing which form a part hereof and wherein:

Figure 1 shows a longitudinal cross-sectional view of flash bulb firing apparatus constructed in accordance with a preferred embodiment of the invention and which can be actuated by an electrical twin circuit from a synchronized contact built into the camera shutter;

Figure 2 is a schematic wiring diagram of the apparatus of Figure 1;

Figure 3 is a cross-sectional view of a modified embodiment constructed in accordance with the present invention, the cross-section being taken approximately on the line 1—1 of Figure 4;

Figure 4 is a cross-sectional view of Figure 3 taken approximately on the line II—II of Figure 3; and, Figure 5 is a schematic electrical wiring diagram of the apparatus of Figures 3 and 4.

Referring now to the drawings wherein the showings are for the purpose of illustrating preferred embodiments of the invention only and not for the purpose of limiting same, Figure 1 shows a reflector 1 mounted by means of a hinge 2 on a housing 3 in a manner so as to revolve on an axis 4. A socket 5 for holding a vacuum flash lamp 6 is fastened to the reflector 1 by means of a tube-shaped member 7 in which are spring plates 8 and 9 held apart by a pressure spring 10. The spring plate 8 carries a reciprocable plunger 11 which extends through an opening 12 into the interior of the socket 5. This plunger 11 bears against the base 13 of the flash bulb 6 when it is in the socket.

The spring plate 9 supports a pin 14 which slidingly passes through the bottom 15 of the tube-shaped member 7 and engages in a cuplike impression 16 of the housing 3.

As long as there is no flash bulb in the socket 5 the plunger 11 urged by the spring 10 extends into the hollow space in the socket 5 and thus prevents the insertion of a new vacuum flash bulb. The spring 17 biases the spring plate 8 in the opposite direction but has a lesser strength than that of the spring 10. Thus the plunger 11 bears against the base 13 and prevents removal of the flash bulb which is under pressure of removal from a contact spring 47 and held in place by the pin 46 on the base 13.

After a flash bulb is fired, or in order to insert a new flash bulb, the reflector 1 with its hinge 2 is rotated through an arc of 90° around the axis 4 in the direction of the arrow until the plunger 14 falls into the deep depression 18 in the housing 3. The spring 10 is then completely expanded and the initially compressed spring 17 can then force back the spring plate 8 and with it the plunger 11. This then releases the flash bulb so that it can be removed and the socket is prepared to receive a new flash bulb.

Simultaneously with the swinging of the reflector 1 in the direction of the arrow, the rack 20 is lifted by the teeth 21 on the partial gear 19 which is keyed to and moves with the hinge 2.

Rotation of the partial gear 19 raises the rack 20 and compresses the spring 22 which engages at its lower end a shoulder on the rack 20 and at its upper end a plate 23 in the housing 3. After a partial movement of the rack 20 the shoulder 25 on the end of a connecting rod 24 is engaged and thereafter the connecting rod 24 rises with the rack 20.

Movement of the connecting rod 20 upwardly raises the plunger 26 until the shoulder 31 is in close proximity to or engages the corresponding shoulder on the plate 32. Just prior to the engagement of the shoulder 31 with the plate 32, however, the lower end of the connecting rod 24 engages a base plate 27 and raises the contact 29 against the bias of the spring 28 into contact with the contact 30 and inductor coil 34 surrounds the plunger 26 and in turn a hollow cylinder 33 of permanent magnetic material surrounds the coil 34. The plunger 26, the end plates 32 and 35 are formed of magnetically permeable material and when the plunger is in the upward position a closed magnetic circuit is provided. The coil 34 is connected to a condenser 36 shown schematically through the contacts 29, 30.

Also, as the rack 20 is raised a bent spring member 37 fastened on the side of the rack 20, engages a spring member 38 and biases a contact 39 mounted thereon toward a contact 40. These contacts 39, 40 are electrically connected across the condenser 36 as is shown in the circuit diagram of Figure 2 and when closed short-circuit out any residual charge which might be on the condenser 36 from previous operations of the generator or which were not removed by the firing of a flash bulb.

In accordance with the invention, the contacts 39, 40 close to discharge the condenser 36 before the contacts 29, 30 close to connect the coil 34 to the condenser 36. The position of the spring 37 and the free-play movement of the connecting rod 24 relative to the rack 20 being so adjusted as to accomplish this sequence of contact closing.

Continued rotation of the partial gear 19 by rotation of the reflector 1 eventually results in the last tooth of the gearing 21 clearing the rack 20, frees the rack 20 to move downwardly under the bias of the compressed spring 22. Downward movement of the rack 20 results in its lower end striking the upper end of the plunger 26 to rapidly break the magnetic circuit previously described and induce a voltage in the coil 34. As the contacts 29, 30 are closed at this instant to connect the coil 34 to the condenser 36, this voltage flows into the condenser 36 to charge it. As the plunger 26 reaches its lowermost position, it strikes the upper side of the base plate 27 to then open the contacts 29, 30 and disconnect the coil 34 from the condenser 36. It will be noted, however, that the contacts 29, 30 do not open until the magnetic circuit has been broken and the flux in the coil 34 has reached almost its minimum value. The base plate 27 is also made of a ferro-magnetic material and when it reaches the lowermost position shown in Figure 1, it is held in this position by a small holding magnet 41. Thus a back discharge of the condenser 36 through the coil 34 is impossible.

The reflector 1 can now be moved from the position to which it is rotated as above described back to the position shown in Figure 1. As it is turned back the upper end of the rack 20 which is pivoted to the lower end of the rack by a hinge 42 is biased to the right as viewed in the figures to provide clearance for the passage of the teeth 21. It will be noted that the spring 37 is fastened to the rack 20 on both sides of the hinge 42 so as to yieldingly bias the rack 20 toward the partial gear 19. A new flash bulb 6 which was inserted when the reflector was tilted to the upper position is now ready to be flashed. Obviously if a flash bulb was not inserted, the reflector may again be rotated in the direction of the arrow to repeat the sequence of operations above described; namely, to discharge the condenser 36 by the closing of the contacts 39 and 40, to close the magnetic circuit by movement of the plunger 26, close the contacts 29, 30 to couple the coil 34 to the condenser 36 and then to break the magnetic circuit, charge the condenser 36 and disconnect the coil 34 from the condenser by the opening of the contacts 29, 30.

An electro-static voltmeter 43 is provided in the housing 3 where it can be seen through a window 44. This electrostatic meter, as is shown schematically in the drawing of Figure 2, is connected across the condenser 36 through the flash bulb 6. If for any reason, the flash bulb 6 is faulty and has an open internal circuit, the meter 43 will not register. Also, if the condenser 36 is discharged for any reason, the meter will also not register. It will be appreciated that an electro-static voltmeter does not draw current or energy from the condenser 36 as is true with other types of indicating apparatus such as lights or moving coil meters When it is desired to flash the bulb 6, the contacts 45 of the camera shutter shown schematically in Figure 2 are closed to complete a circuit from the condenser 36 through the flash bulb 6. Obviously, the circuit to the camera may be other than that shown.

Referring now to Figures 3 through 5 wherein alternative embodiments of the invention as shown, these figures show a cover 48 closing a housing 49 in which is mounted a magneto-electric impact inductor 50 having a core 51 slidably mounted therein. This core 51 includes a cylindrical projection 52 surrounded by a compression helical spring 53 engaging at one end the upper surface 54 of the impact inductor and on the other end a plate 55 fastened to the projection 52. A short cylindrical projection 56 protrudes above this plate 55.

A disc 57 is rotatably supported in the back of the housing 49 on a shaft 59 having an axis perpendicular to the line of movement of the core 51 of the impact inductor 50. This disc 57 has a shallow hole 58 in its outer surface like a telephone dial radially spaced from the shaft 59. A spiral spring 60 is mounted in an opening in the disc 57 and is connected at one end to the shaft 59 and at the other end to the disc 57 and preferably is pre-tensioned so as to bias the disc 57 at all times so as to move in a counter-clockwise direction as viewed in Figure 3. The disc 57 may thus be rotated in a clockwise direction as viewed in Figure 3 to further tension the spring 60. A member 61 of considerable mass is mounted on the disc 57 to move therewith and is so positioned that when the disc 57 is released from its maximum clockwise position; namely, that as shown in Figure 3, it is rotated about the axis 59 in a counter-clockwise direction to strike the projection 56 and thus open the magnetic circuit of the impact inductor 50.

The opening of the magnetic circuit induces a voltage in the coil of the inductor 50. At the same time as the core 51 comes out of the bottom of the inductor 50, it presses against a spring 62 having a member 63 of magnetic material fastened thereto. This member 63 is then moved into an engagement with a small permanent magnet 64 which holds the member 63 in that position. Moving of the member 63 toward the magnet 64 opens the contacts 65. These contacts 65 were previously closed and, as shown in Figure 5, connect the inductor 50 will the condenser 66. Thus, at the moment the magnetic circuit is broken, current flows in to charge the condenser 66. Opening of the contacts 65, however, prevents a backflow of current from the condenser 60 to the inductor as the voltage generated by the inductor reaches its maximum and commences to decrease.

In the embodiment of the invention shown, the arrangement is such that movement of the disc 57 to the maximum counterclockwise position both blocks the socket into which flash bulb 70 will be inserted and, at the same time, the member blocking this socket is arranged to hold the disc 57 in the full clockwise position that is the full tension position. In the embodiment shown, the lever 67 pivoted on the socket base at 68 has an upturned end which engages in a groove on the radially innerside of the member 61. The opposite end is bent as at 69, and extends into the flash bulb socket. A spring 71 biases the end 69 into this position, as well as biasing the opposite end of the lever 67 into locking engagement with the groove on the radially innerface of the member 61.

Insertion of a new flash bulb in the socket causes the base of the bulb to push the nose 69 out of the socket and, at the same time, to rotate the member 67 so as to release the disc 57 which then rotates at high speed under the tensioning of the spring 60 to actuate the impact generator as above described. Then as the bulb 70 is pushed further into the socket, the nose 69 hooks over the pin 72 on the base of the flash bulb 60 to keep the bulb in the socket against the bias of the spring 73.

After the bulb is flashed and the disc 57 again actuated, the lever 67 is rotated by engagement with the slanting surfaces 74 on the innermost surface of the member 61 so as to release the pin 72 and allow the flash bulb 70 to be ejected from its socket.

Contacts 75 mounted on the inner wall of the housing 49 are closed by passage of the member 61 so that in the event a flash bulb is not fired and the condenser 66 still has a charge in it at the time, the disc 57 is rotated to tension the spring 60, the condenser will first be discharged by the closing of the contacts 75. Then, as the disc 57 is continued to be rotated in a counterclockwise direction, the end 76 of the spring 62 is engaged by the sloping surface 74 to pull the members 63 away from the holding magnet 64 and to close the contacts 65. At the time these contacts close the condenser 66 will be fully discharged as above described. The contact 65 then remains closed until the member 61 strikes the core 51 to actuate the impact conductor 50 and then subsequently open the contacts 65.

An electrostatic voltmeter 77 is shown schematically in Figure 3 and may be provided as was done in the preferred embodiment.

No reflector or the like is shown in connection with this embodiment of the invention inasmuch as any type of reflector may be provided.

It will thus be seen that embodiments of the invention have been described which accomplish the object of the invention heretofore set forth and others, and provide apparatus which is simple in construction, easy to operate, insures that when a flash bulb is inserted in the socket, the condenser for firing same will always be fully charged, provides contacts which will connect the generator to the condenser only until the generator has reached its maximum output voltage, has contacts which discharge the condenser just prior to any recharging so that it will always be charged to the same amount and has a positive indicating device for indicating that the flash bulb is in proper working order and that the condenser is fully charged.

The invention has been described and illustrated only in connection with preferred forms which the invention may take. Obviously modifications and alterations differing radically from those shown will occur to others upon a reading and understanding of this specification and it is my intention to include all such modifications and alterations insofar as they come within the scope of the appended claims.

Having thus described my invention, I claim:

1. Apparatus for firing flash bulbs comprising, in combination: a socket for receiving flash bulbs, a condenser adapted to be selectively connected to said socket for firing flash bulbs therein, an electro-magnetic generator for charging said condenser, a spring mechanism for driving said generator manually operable means for prestressing said mechanism and a member having a portion extending into said socket engageable with a flash bulb as it is inserted therein and a second portion co-acting with said manually operable means for prestressing said spring mechanism said member preventing the insertion of a flash bulb until the prestressed spring mechanism has been released to drive said generator.

2. The combination of claim 1, wherein said second portion has an interlocking engagement with said manually operable means and said first portion when engaged with a flash bulb releases said interlocking engagement.

3. Apparatus for charging a condenser adapted to be selectively connected to a flash bulb for firing same comprising, in combination: a condenser, an impact-type magneto-electric generator, including a reciprocable plunger contacts for electrically connecting said generator to said condenser and mechanical means inter-connecting said plunger and contact for opening the contact after completion of a stroke of said plunger.

4. The combination of claim 3 wherein said apparatus includes a prestressable spring mechanism and said contacts are associated with said mechanism so as to be closed as said spring mechanism is prestressed.

5. The combination of claim 4 wherein said apparatus includes a second pair of contacts operable to short-circuit said condenser as said spring mechanism is pre-tensioned.

6. Apparatus for firing flash bulbs comprising, in combination: a flash bulb circuit which when energized fires the flash bulb, a condenser adapted to have electrical energy stored therein and to be connected to said circuit through external contacts and an electrostatic-type voltmeter connected across said condenser through said flash bulb circuit whereby said meter indicates not only whether the condenser is charged but whether the flash bulb circuit is complete and ready for firing.

7. Apparatus for firing flash bulbs comprising, in combination: a flash bulb receiving socket, a condenser having a first terminal connected to a first terminal on said socket and a second terminal adapted to be connected to a second terminal on said socket through normally open contacts, and an electrostatic voltmeter connected between said first terminals and said socket second terminal.

8. Flash bulb firing apparatus comprising, in combination: an electric generator for charging a condenser, spring means for driving said generator, a flash bulb socket movably supported relative to said spring means and means interconnecting said socket and said spring means whereby movement of said socket relative to said spring means will pre-tension same.

9. A flash gun comprising, in combination: a flash bulb socket, a condenser adapted to be connected to said socket through external contacts, a magneto-electric type generator for charging said condenser, spring means for actuating said generator, said socket being movably mounted relative to said spring means and means for tensioning said spring means upon movement of said socket.

10. A flash bulb firing apparatus comprising, in combination: a flash bulb socket, a condenser adapted to be connected through external contacts to a flash bulb in said socket, a magneto electric type generator for charging said condenser, said socket being movable relative to said spring means and mechanical means interconnecting said socket and said spring means for tensioning and releasing said spring means upon movement of said socket whereby said condenser will be charged.

11. The combination of claim 10 wherein obstruction means are provided for said socket in combination with means for removing said obstruction means as said socket is moved to pretension and release said spring means.

12. A flash bulb firing apparatus comprising, in combination: a flash bulb socket, a condenser adapted to be connected to said flash bulb through external contacts, a magneto-electric generator for charging said condenser, spring means for actuating said generator, means for tensioning said spring means, means for holding said spring means tensioned, including a member extending into said socket actuated by insertion of a flash bulb therein for the purpose of releasing said spring means and actuating said generator.

13. Apparatus for firing flash bulbs comprising, in combination: an impact-type magneto-electric generator, a condenser adapted to be connected to said generator and be charged thereby, spring means adapted to be pre-tensioned to actuate said generator upon release thereof, normally open contact means connected across said condenser and arranged to be closed during pre-tensioning of said spring means, other contacts connected between said generator and said condenser and arranged to be closed upon completion of pre-tensioning of said spring means, and means for opening said last-mentioned contact after actuation of said generator.

References Cited in the file of this patent

UNITED STATES PATENTS

| | | |
|---|---|---|
| 2,272,102 | Wildman | Feb. 3, 1942 |
| 2,409,967 | Weisglass | Oct. 22, 1946 |
| 2,477,895 | Pollock | Aug. 2, 1949 |
| 2,617,851 | Bisch | Nov. 11, 1952 |
| 2,638,764 | Schwartz | May 19, 1953 |
| 2,730,885 | Kaprelian | Jan. 17, 1956 |